UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD FOR PRODUCING COMPOSITE TITANIC-OXID PRODUCTS.

1,234,260.  Specification of Letters Patent.  Patented July 24, 1917.

No Drawing.  Application filed July 19, 1915.  Serial No. 40,639.

*To all whom it may concern:*

Be it known that I, LOUIS E. BARTON, a citizen of the United States, and a resident of Niagara Falls, in the county of Niagara and State of New York, have invented certain new and useful Improvements in Methods for Producing Composite Titanic-Oxid Products, of which the following is a specification.

My present invention relates especially to such products utilized as pigments in paint, including others also, containing important percentages of titanic oxid. Its objects comprise provision of methods whereby, as is desirable for certain purposes, composite titanic oxid pigments can be, on industrial scales of manufacture, produced by aid of precipitation of orthotitanic acid on suspended particles of any desired substance, thus including even "extender pigments" of the types familiar in the paint art, there being thus imparted to the resulting products, or pigments, qualities rendering them exceptionally useful for certain purposes.

In Letters Patent No. 1,155,462, dated October 5th, 1915, I have disclosed and claimed a process for producing compound titanic oxid products, or pigments, by aid of precipitation of metatitanic acid upon particles of a suspended base, the precipitation in those instances occurring by aid of addition of salts hydrochloric acid solutions.

In my pending application for patent Serial Number 861,184, filed September 11, 1914, I have disclosed a process, invented by me, for obtaining pure titanic oxid by aid of precipitating metatitanic acid from hydrochloric acid solutions and calcining the precipitate, the final product being a soft fine powder suitable for pigment purposes.

I am aware that by addition to a titanic solution of a base, such as ammonia, or soda, to neutrality of the solution, orthotitanic acid is precipitatable, but this acid thus precipitated is, when separated, dried and calcined, usually of too coarse and gritty consistency and texture to be well suited for pigment purposes, although if ground to a fine powder it may, when mixed with oil, possess considerable of the hiding power which is essential in paint.

My present invention comprises the discovery that if orthotitanic acid be precipitated in any titanic solution containing suitable suspended particles of a substance, or substances, (hereinafter referred to as suspended base pigments), upon which the orthotitanic acid can, in gelatinous state, fix itself, or with which it can coalesce, and the composite results of such precipitation and coalescence be then filtered out and calcined, the final products, instead of being coarse and gritty, will prove to be extremely fine, soft, smooth, powders and correspondingly superior for such purposes as pigments.

My invention comprises also the discovery that suspended bases suitable for such reception of, and coalescence with, the thus precipitated orthotitanic acid, include the so called extender pigments used in compounding paints, such, for example, as barytes (natural barium sulfate), silica, china-clay, asbestin, etc.

I have discovered that a suitable precipitating agent when such extender pigments are thus employed may be any of the alkalis as, for example, sodium hydroxid, ammonium hydroxid, potassium carbonate, or sodium sulfid.

And a particularly important feature of my invention is my further discovery that the best final products are obtainable, and with greater economy, by operating in a titanic sulfate solution, treated with a reagent which is capable both of acting as the precipitant of the orthotitanic acid, and also of supplying by reaction with the solution the required suspended base particles. My researches have demonstrated that the alkali earth bases can be successfully used as such last referred to reagent, viz: calcium hydrate, $Ca(OH)_2$, or barium hydrate, Ba(OH)$_2$, or barium sulfid, BaS, or other bases the sulfates of which are practically insoluble in water.

When such reagents as these are employed, my product is obtained by co-precipitation of titanic hydroxid (orthotitanic acid) and the sulfate base, this resulting in the most intimate and homogeneous mixture of the ingredients of the final product, and in development in the highest degree of the desired pigment properties of titanic oxid upon calcination. The final products thus obtained are fine, soft, powders consisting of amorphous, titanic oxid, coalesced with a sulfate base.

In the various applications of my invention, the chemical composition and specific gravity of the final products will, of course, depend upon the nature of the precipitating agent employed and the composition of the titanic solution used.

The color of my products will, of course, depend upon the purity of the materials; thus, for example, if the titanic sulfate solution employed is practically free from iron, the product will be white, and will range from this to light, or even dark, cream color, in proportion to iron present.

I provide procedures whereby my highest grade product may be derived from relatively impure titanic solutions, as for example, those containing small quantities of copper, or other elements, whose sulfids are insoluble in dilute acids. Such impurities I remove by passing hydrogen sulfid gas into the solution and filtering out the preciptated sulfid.

Should the titanic solution contain, as an impurity, more iron than desired, I use as the precipitating agent a sulfid, or a mixture of a sulfid with an oxid base. In either case the iron will be precipitated with the product as iron sulfid. For example, if it is desired to precipitate the orthotitanic acid on a silica suspended base which has been added as such to the solution, I add as the precipitating agent sodium sulfid, or a mixture of sodium hydroxid, or of sodium carbonate, with sodium sulfid. If, on the other hand, the suspended base is, as above described, formed by precipitation of sulfates in a titanic sulfate solution, I add to the latter purified from copper and other impurities as above described, barium sulfid as the precipitant, or a mixture of calcium hydrate and sodium sulfid, or a mixture of calcium hydrate and barium sulfid, the essential being to add enough of the sulfid to insure the precipitation of the iron in the form of iron sulfid. It is my experience that in such cases the precipitant substances employed should, for the best results, contain of the sulfid the chemical equivalent of at least 25% of the sulfates to be acted upon. When several precipitants are thus employed together it is usually preferable, though not invariably necessary, that they be mixed before addition, but in some cases it is better to add them successively. For example, if one of the precipitants is calcium hydrate, by first adding it separately, opportunity is afforded for its complete reaction with sulfates in solution, thus insuring presence of the resulting suspended base, required, before addition of the more quickly reactive sulfid.

The pigment product having thus been precipitated, I conduct sulfur dioxid gas into the solution until the iron sulfid is decomposed and dissolved. Though this may result in the solution being then slightly acid with sulfurous acid, the latter does not react to dissolve titanic acid or precipitated base more than negligibly, and therefore does not substantially impair yield of the final product.

I first obtain, or prepare, in any convenient manner, a titanic solution, the which may be either a hydrochloric, a sulfuric, or other, acid, solution, except that, if the suspended base is to be formed by its precipitation therein, a titanic sulfate solution is preferable, and I will, therefore, assume such to be the one employed in what follows. To such solution I either add the desired extender pigment as such, or the precipitant or precipitants, referred to, the latter being preferably dissolved, or at least suspended, in water; or, in some cases, I may add both the extender and the precipitant to the titanic solution.

From analysis of the latter I calculate the quantity of precipitant, or mixture of precipitants, required, the rule being that, in practically all cases, such quantity be sufficient to combine with all the sulfate in the solution except sodium sulfate. Slight discrepancies between what calculated and required may be compensated by adding the precipitant slowly and stopping when the mixed solution shows a slightly alkaline reaction.

During the precipitation I thoroughly agitate the solution, and this particularly if an extender pigment has been incorporated and suspended as aforesaid to form the suspended base pigment.

After the precipitation the solution is ready for the next step in my process, though if a part of the precipitant has been added in undissolved, i. e. already suspended, form, as would be calcium hydrate for example, it is better practice to allow the charge to stand with occasional agitation during an interval of say one half an hour to an hour in order to insure more complete reaction between the precipitant and the sulfates in solution.

In operations in which I desire that the precipitated product shall be purified from iron in the solution, I, at this stage, incorporate sulfurous acid as by conducting sulfur dioxid gas into the charge as before described, thus decomposing and dissolving the iron sulfid present.

My next step in the operation is to filter out the precipitate, which I thereafter wash with cold water, dry, and calcine at a temperature of from say 600° C. to 800° C., thus obtaining my final composite titanic oxid product, or pigment.

In my herewith copending application for Letters Patent Serial Number 23,520, filed April 23, 1915, I have described and claimed a method, and resulting product, whereby, by aid of alkali earth bases added as precipitants to a titanic sulfate solution, there are therein precipitated sulfate particles, and also particles of basic titanic sulfate (i. e. titanic sulfate combined with hydrated titanic oxid), the resulting uncalcined composite precipitate product being distinguished as consisting essentially of such sulfate particles coalesced with said basic titanic sulfate.

The said method of my previous application differs from that of the present, among other respects, in that the titanic precipitate sought and attained by the latter is orthotitanic acid instead of basic titanic sulfate, and in that, to that end, while a titanic sulfate solution may be employed in either method, and likewise alkali earth bases as precipitants, the quantity of the latter employed in my previous method is insufficient to produce a permanent precipitate of orthotitanic acid, also in that requisite acidity of the titanic solution is, in my previous method, insured by additions of sulfuric acid, and the charge is heated and otherwise treated so as to insure that its titanic constituents shall precipitate in the form of basic titanic sulfate, while, by my present method, the procedure is altered so as to insure precipitation of orthotitanic acid, and, consequently, the quantity of the alkali earth bases is not so restricted. Titanic acid solutions other than titanic sulfate may, in certain cases, be employed as above stated. Additions of acid are omitted and the charge is not heated.

Each of my said methods possesses its own characteristic and distinctive advantages in procedure and results, and, as regards special uses for its respective products.

The uncalcined composite precipitate product of my present method is of distinctive and special utility for certain purposes in the arts, and, when dried, it consists essentially of particles of extender pigment, or of sulfate particles, or of both, having therewith coalesced very minute particles of orthotitanic acid.

Having now described my invention, what I claim as new and desire to secure by Letters Patent is the following, viz:—

1. The method of treating a titanic sulfate solution which comprises precipitating therein sulfate particles, and also particles of orthotitanic acid.

2. In the production of composite titanic products from a titanic sulfate solution, the step which consists in adding to such solution a reagent capable of acting therein both as a precipitant of sulfate particles, and also of orthotitanic acid particles, and thereafter maintaining the charge so as to insure precipitation of titanic constituents in the form of orthotitanic acid.

3. The method of producing composite titanic oxid pigments which comprises adding to a titanic sulfate solution a base capable of therein forming an insoluble sulfate, and thereafter maintaining the charge so as to promote precipitation therein of orthotitanic acid.

4. In the production of composite titanic oxid products from a titanic sulfate solution, the step which consists in adding to such solution an alkali earth base.

5. In the production of composite titanic oxid products from a titanic sulfate solution, the step which consists in adding to such solution calcium hydrate.

6. In the production of composite titanic oxid products from a titanic sulfate solution, the step which consists in adding to such solution a reagent capable both of acting as a precipitant of orthotitanic acid, and also of supplying to the solution by reaction therewith suspended base pigment particles.

7. The method of producing pigments containing titanic oxid from a titanic sulfate solution, which comprises adding to such solution a reagent capable both of acting as a precipitant of orthotitanic acid and also of supplying to the solution by reaction therewith suspended base pigment particles, withdrawing the resulting orthotitanic acid precipitate together with said particles, and calcining them.

8. The method of producing pigments containing titanic oxid from a titanic sulfate solution which consists in adding thereto an alkali earth base, withdrawing therefrom the resulting composition of orthotitanic acid precipitate and therewith coalesced sulfate base pigment, and calcining it.

9. The method of producing pigments containing titanic oxid from impure titanic sulfate solutions which comprises passing hydrogen sulfid gas into the solution, filtering out precipitated sulfids, adding to the filtrate an alkali earth base, withdrawing therefrom the resulting composition of orthotitanic acid precipitate and therewith coalesced sulfate base pigment, and calcining it.

10. The method of producing pigments containing titanic oxid from iron-containing titanic sulfate solution which comprises adding to such solution an alkali earth sulfid base, adding sulfurous acid to the charge, withdrawing therefrom the resulting composition of orthotitanic acid precipitate and therewith coalesced sulfate base pigment, and calcining such composition.

11. In the production of composite titanic products from a titanic solution, the step which consists in precipitating orthotitanic acid upon particles of matter suspended in said solution.

12. As a new composition of matter, the hereinbefore described uncalcined composite precipitate distinguished as consisting essentially of sulfate particles coalesced with orthotitanic acid.

LOUIS E. BARTON.

Witnesses:
WM. V. KNOWLES,
C. J. KINZIE.